United States Patent [19]

Norcia et al.

[11] 4,007,949
[45] Feb. 15, 1977

[54] VEHICLE WHEEL LOADING BAR AND MOUNTING ARRANGEMENT

[76] Inventors: John A. Norcia, 2906 Susset St. NW., Canton, Ohio 44718;
Raymond E. Bickar, 2838 Saxon St. NE., Canton, Ohio 44721

[22] Filed: Nov. 25, 1975

[21] Appl. No.: 635,260

[52] U.S. Cl. .................................. 280/767; 267/48
[51] Int. Cl.² ....................................... B60G 11/02
[58] Field of Search .......... 280/755, 757, 767, 293; 267/48

[56] References Cited

UNITED STATES PATENTS

| 3,523,697 | 8/1970 | O'Sullivan | 280/767 |
| 3,746,365 | 7/1973 | Kirschbaum | 280/767 |
| 3,900,119 | 11/1975 | Olsen | 280/767 |

*Primary Examiner*—Joseph F. Peters, Jr.
*Assistant Examiner*—Richard A. Bertsch
*Attorney, Agent, or Firm*—Frease & Bishop

[57] ABSTRACT

A loading bar is mounted on a leaf spring of a racing vehicle rear axle suspension system to increase traction on the vehicle tires during acceleration. Strut tube and strap members are mounted in a spaced relationship on the vehicle leaf spring rearwardly and adjacent to the vehicle axle by a pair of U-bolts and reinforcing plates. The tube and strap members extend rearwardly from the axle and are joined at their extended ends by a wheel bracket and a strut tube adjusting channel. The strut tube extends in an upwardly angled direction between the adjusting channel and axle, with the strap member being generally parallel with respect to the ground or racetrack. A wheel or roller is mounted on the wheel bracket and is spaced above the ground when in static condition. The loading bar is readily adjustable on the leaf spring to change the traction aiding effect thereof. Upon rapid acceleration of the vehicle, the torque loading and rotation of the differential housing deflects the leaf spring in an area adjacent the spaced mounting of the loading bar which pivots the loading bar wheel into contact with the ground. The leverage gained from the loading bar forces the rear driving wheels of the vehicle down onto the pavement with more force than that gained from the weight transferred along. momentarily increasing the traction on the tires.

16 Claims, 7 Drawing Figures

U.S. Patent  Feb. 15, 1977  Sheet 1 of 2  4,007,949
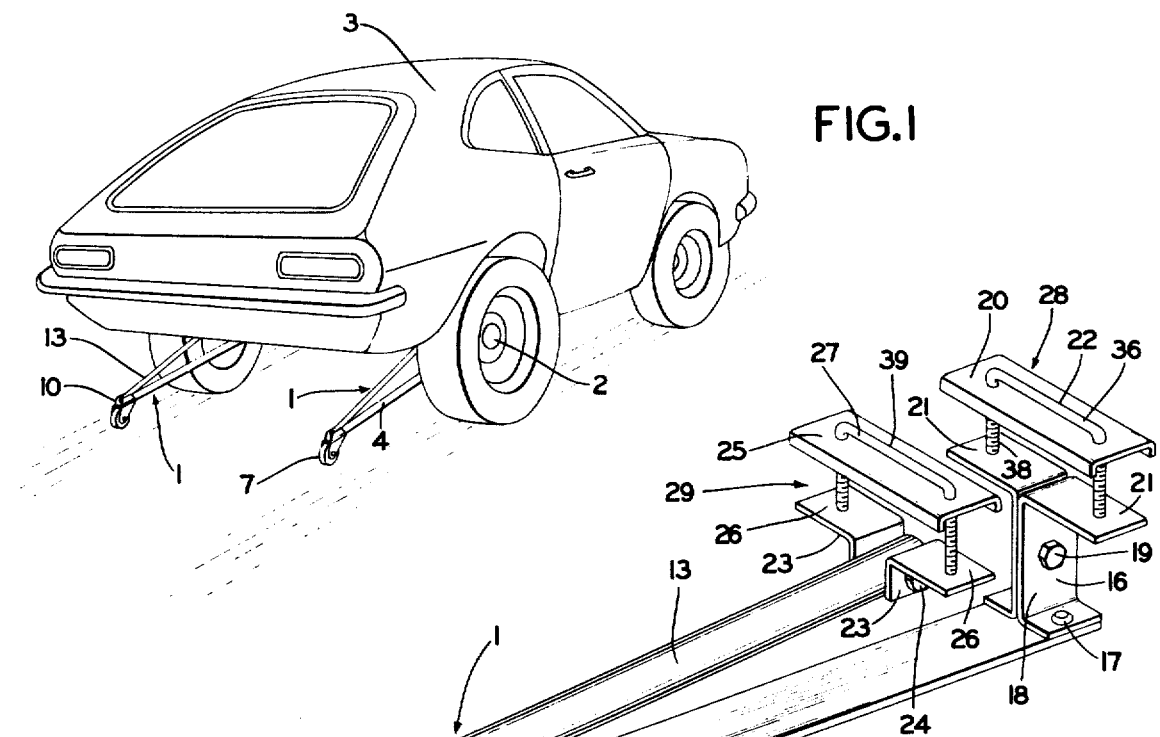
FIG.1
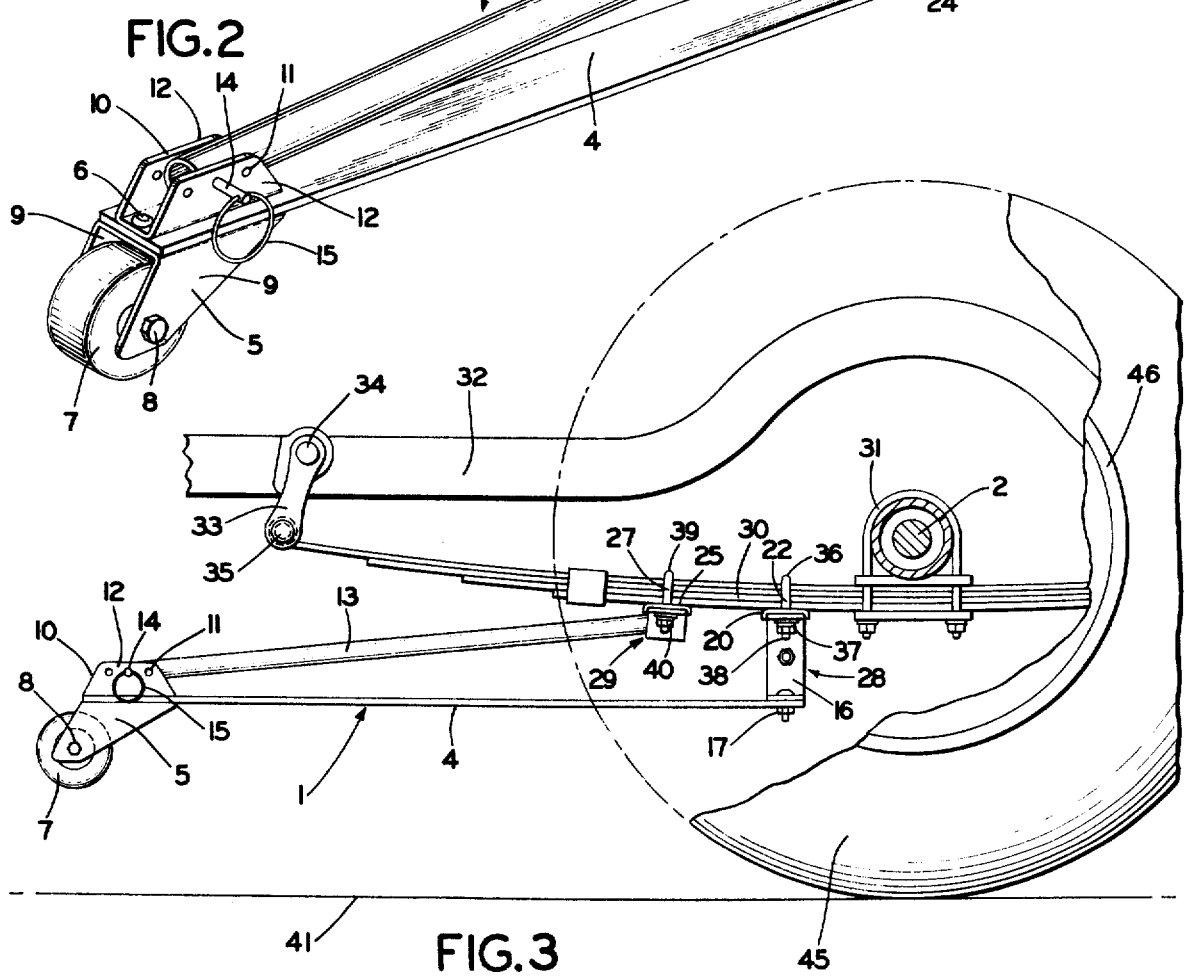
FIG.2
FIG.3

VEHICLE WHEEL LOADING BAR AND MOUNTING ARRANGEMENT

BACKGROUND OF THE INVENTION

1. Field of the Invention

The invention relates to drag racing vehicles and in particular to a loading device which increases the traction on the vehicle wheels during acceleration. More particularly, the invention relates to a wheel loading bar and its mounting arrangement on a leaf spring of a drag racing car which gains leverage from the device to force the rear vehicle driving wheels down onto the pavement to increase the traction of the tires during acceleration.

2. Description of the Prior Art

The popularity of drag racing vehicles has increased considerably over the years with vehicles and equipment being devised and used to provide the driver and vehicle with a competitive advantage. The drag racing vehicles or "dragsters" start from an at rest position and experience a large acceleration at the instant of start as the dragster moves from its starting point downwardly along the race track.

The large starting acceleration transfers much of the vehicle weight to the rear of the car which forces the vehicle rear driving wheels down onto the pavement increasing the traction between the tires and pavement. The greater the amount of traction obtained during this initial acceleration, greater will be the drivers chance of winning the race when the other factors are equal. This acceleration and weight transfer, however, tends to raise the front wheels of the vehicle off the pavement, which if excessive, effects the efficiency of the vehicle.

Various bar constructions and devices have been used in the past on the rear portion of race cars to keep the front wheels of the vehicle from rising excessively high into the air. These bar devices have wheels or rollers mounted on the rearwardly extended ends of the bars with the wheel being spaced a short distance above the ground behind the vehicle when in a static condition. The wheels engage the ground immediately upon acceleration of the vehicle due to the weight transfer thereof, which restrains the continued upward movement of the front wheels of the vehicle. These known bar devices, however, are firmly attached to the body chasis or directly to the axle housing by welding or bolted brackets. Due to this rigid mounting of the bars to a fixed part of the vehicle, these bar devices have a tendency to unload the chasis weight from the vehicle rear wheels and reduce the traction torque thereon by transferring some of the weight to the wheel or roller of the bar device, thus decreasing traction between the race tires and roadway.

Furthermore, these known bar devices do not permit rapid adjustment with respect to their mounting position on the vehicle to provide change in the traction effect and operating conditions of the vehicle to meet changes in race track conditions. Such permanent mountings of prior devices in many installations require welding or drilling of mounting holes in portions of the vehicle which is both troublesome and expensive.

No wheel loading bar device of which we are aware provides for adjustably mounting a wheel loading bar on the leaf spring of the rear wheel suspension system rearwardly and adjacent to the rear wheel axle which limits the upward lift of the vehicle front wheels, and in which the deflection experienced by the rear leaf spring due to the torque loading and rotation of the differential housing upon sudden acceleration of the vehicle is transferred by the loading bar device and forces the rear wheels down on the pavement with increased force, momentarily increasing the traction of the tires.

SUMMARY OF THE INVENTION

Objectives of the invention include providing a vehicle wheel loading bar and mounting arrangement for drag racing vehicles in which the loading bar is mounted in spaced positions on the leaf spring of the rear wheel suspension system rearwardly and adjacent to the rear wheel axle to limit the upward lift of the vehicle front wheels and to increase traction on the rear wheels; providing such a combination loading bar and mounting arrangement which uses the weight transfer to the rear of the car under sudden acceleration to gain leverage from the device to force the rear vehicle driving wheels down onto the pavement with more force than that gained from the weight transfer alone, thus, increasing the traction of the tires; providing such a loading bar and mounting arrangement combination in which the loading bar is easily adjusted to various positions on the leaf spring to effect the amount of traction increase gained by the loading bar merely by loosening several bolts permitting the loading bar to be moved along the leaf spring and by adjusting a pinned connection of one of the loading bar strut members in an adjustment bracket; providing such a loading bar and mounting arrangement combination in which the loading bar is formed of readily available and inexpensively manufactured components which are of a rugged and simple configuration, which can be easily assembled and mounted on a vehicle by an inexperienced person; and providing such a loading bar and mounting arrangement combination which eliminates difficulties heretofore encountered, achieves the stated objectives, efficiently and effectively, and solves problems and satisfies existing needs.

These objectives and advantages are obtained by the vehicle wheel loading bar and mounting arrangement, the general nature of which may be stated as including a vehicle having a rear axle and road engaging wheel means mounted on the axle; leaf spring means operatively mounted on the axle and extending rearwardly from the axle to a fixed support on the vehicle; loading bar means mounted on the leaf spring means generally adjacent to and rearwardly of the rear axle; the loading bar means including a first strut member having an end adjustably mounted on the leaf spring means adjacent and rearwardly of the vehicle axle, and a second strut member having an end adjustably mounted on the leaf spring means spaced rearwardly of and generally adjacent to the first strut member; bracket means operatively connected to and joining the other ends of the first and second strut members; and wheel means rotatably mounted on the bracket means and being adapted to engage the ground upon sudden acceleration of the vehicle with the first and second strut members providing leverage due to the deflection of the leaf spring means adjacent the spaced mountings of the first and second strut members to force the vehicle rear wheel means down onto the ground to increase the traction of the wheel means with respect to the ground.

BRIEF DESCRIPTION OF THE DRAWINGS

A preferred embodiment of the invention — illustrative of the best mode in which the applicants have contemplated applying the principles — is set forth in the following description and shown in the drawings and is particularly and distinctly pointed out and set forth in the appended claims.

FIG. 1 is a diagrammatic perspective view of a pair of the wheel loading bars mounted on a racing vehicle;

FIG. 2 is an enlarged perspective view of one of the wheel loading bars removed from the vehicle;

FIG. 3 is a fragmentary enlarged elevational view with portions broken away, of one of the wheel loading bars of FIG. 1 shown mounted on the vehicle leaf spring in static or unactuated position;

Similar numerals refer to similar parts throughout the drawings.

DESCRIPTION OF THE PREFERRED EMBODIMENT

Figure 4:
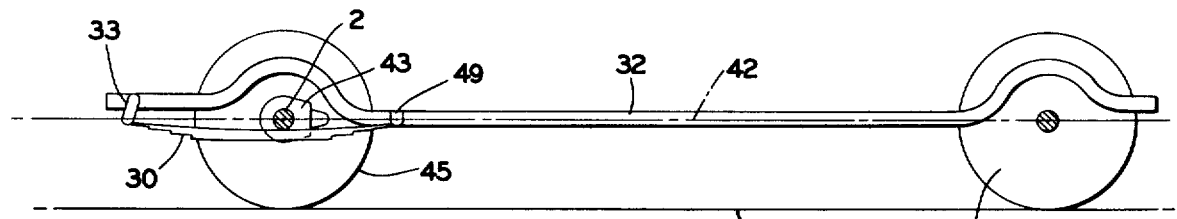
FIG. 4 is a diagrammatic view of a typical leaf spring mounted vehicle chasis in static position prior to mounting the wheel loading bars thereon.

A pair of the improved wheel loading bar constructions, indicated generally at 1, is mounted on the rear axle 2 of a racing vehicle 3 (FIG. 1). The improved loading bar construction 1 is shown particularly in FIG. 2 in unmounted position, and in a mounted static position in FIG. 3.

Construction 1 includes a main base strap 4, preferably formed of a rectangular, flat metal strip of material. An inverted U-shaped wheel bracket channel 5 is mounted by bolts 6 or other fastening means to the bottom surface of strap 4, with a wheel or roller 7 being rotatably mounted by bolt 8 between the depending channel legs 9 of bracket 5. A U-shaped adjusting channel 10 is mounted on the top surface of strap 4 by bolts 6, and is formed with a plurality of aligned adjustment holes 11 in the top portions of channel legs 12.

A strut tube 13 is pivotally mounted on adjusting channel 10 by a pin 14 which extends through a selected pair of aligned adjustment holes 11 and a complementary hole formed in an end of tube 13. A locking ring 15 extends through a hole formed in an end of pin 14 preventing accidental and premature removal of pin 14 from adjusting channel 10 and subsequent disconnection of tube 13.

A pair of upstanding U-shaped support brackets 16 (FIG. 2) are mounted by bolts 17 on the top surface of strap 4 at the strap end opposite of channels 5 and 10. The webs 18 of support brackets 16 are joined in abutting relationship by a bolt 19. A reinforcing plate 20 is movably mounted with respect to top legs 21 of support brackets 16 by a U-bolt 22. A pair of strut support angles 23 are pivotally mounted on the end of strut tube 13 which is opposite channels 5 and 10, by a bolt 24. A reinforcing plate 25 is adjustably mounted with respect to outwardly extending legs 26 of angles 23 by a second U-bolt 27.

All of the components forming loading bar 1 are of a simple, inexpensive, rugged arrangement, easily fabricated from metal strips and tubing, and are assembled by a minimum of bolts and nuts, thereby, enabling the loading bar to be packaged, shipped, and sold in disassembled condition and readily assembled, by a purchaser on the racing vehicle. Likewise, the use of such standard components enables replacement and repair to be accomplished easily and inexpensively with a minimum of time delay should such maintenance be necessary.

Support brackets 16, reinforcing plate 20, and U-bolt 22 form an adjustable mounting assembly indicated generally at 28, for strap 4. Support angles 23, reinforcing plate 25, and U-bolt 27 form an adjustable mounting assembly, indicated generally at 29, for strut tube 13, which together with strap mounting assembly 28, permit loading bar construction 1 to be easily mounted and adjusted on a racing vehicle.

In further accordance with the invention, each loading bar construction 1 is mounted on a leaf spring 30 of the suspension system for rear axle 2 of the vehicle instead of the heretofore rigid mounting on a fixed part of the vehicle. Leaf spring 30 may be mounted on axle 2 by a U-bolt 31 or other suspension and connection means which forms no part of the subject invention. The rearmost end of spring 30 is connected to a fixed position on vehicle frame 32 by a shackle 33, which may be pivotally mounted at 34 to frame 32 and at 35 to the extended end of leaf spring 30. Base strap mounting assembly 28 is mounted on leaf spring 30 generally adjacent to and spaced rearwardly of vehicle axle 2. Spring 30 is clamped between web portion 36 of U-bolt 22 and reinforcing plate 20 by tightening nuts 37 on threaded leg portions 38 of bolt 22.

Strut tube mounting assembly 29 is mounted on leaf spring 30 spaced from and rearwardly of strap mounting assembly 28, as shown in FIG. 3. Mounting assembly 29 is secured to spring 30 in a similar manner as is strap mounting assembly 28. Spring 30 is clamped between web 39 of bolt 27 and reinforcing plate 25 by U-bolt nuts 40.

The spacing between strap mounting assembly 28 and strut tube mounting assembly 29 is regulated easily by movement of the extended end of strut tube 13 within adjusting channel 10 and the subsequent insertion of pin 14 in a selected pair of adjustment holes 11. Adjustment of the mounting positions of mounting assembly 28 and 29, likewise, is accomplished easily by loosening of U-bolt nuts 37 and 40 permitting the mounting assemblies to be slid and moved along spring 30 to their desired mounting positions.

Loading bar construction 1 is shown in FIG. 3 in its usual static position with base strap 4 extending generally parallel with and spaced above the race track or ground, which is indicated at 41. Loading bar wheel 7 is positioned above the ground as shown in FIG. 3, which, for most racing vehicles, will be within a range of 2 to 4 inches.

The operation of improved loading bar construction 1 and its mounting with respect to vehicle leaf spring 30 is described below and is shown particularly in diagrammatic form in FIGS. 4-7.

Figure 6:
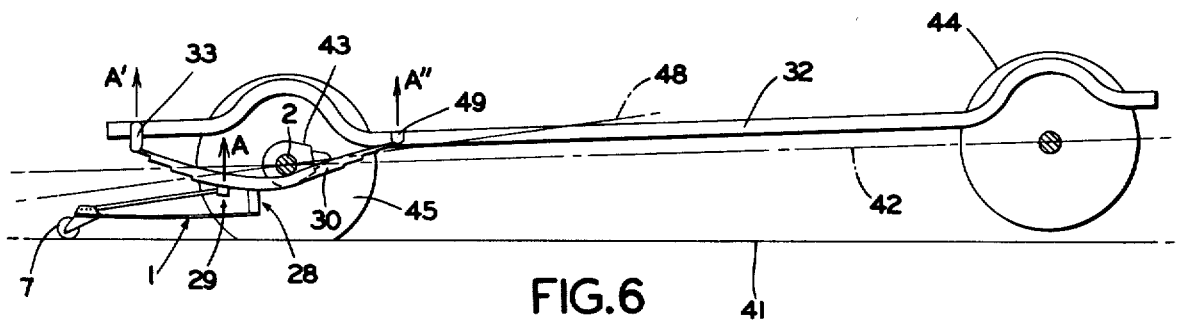
FIG. 6 is a view similar to FIG. 5 showing the vehicle wheel loading bar in ground engaging position at the moment of torque loading and acceleration of the vehicle.
Figure 7:
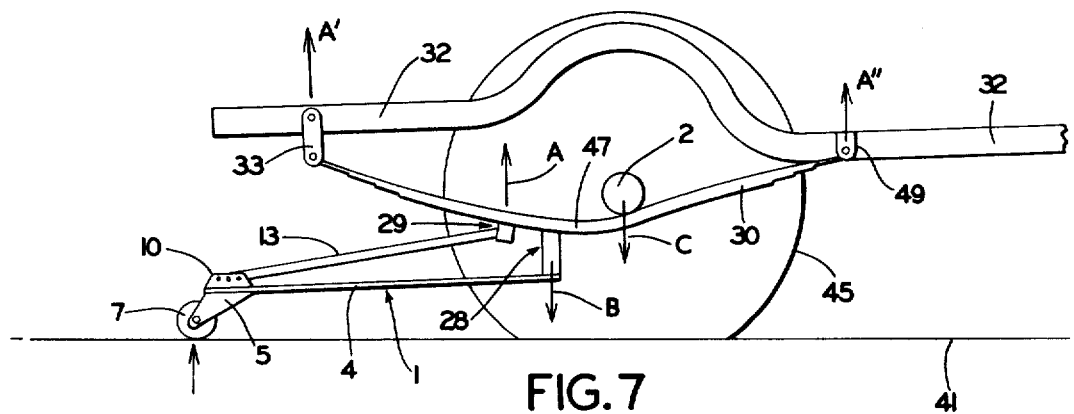
FIG. 7 is an enlarged diagrammatic view of the rear wheel of FIG. 6 showing the lever effect and force transfer occurring between the vehicle and wheel loading bar during acceleration.

Vehicle frame 32 and leaf spring 30, when in an at rest or static condition, will assume the general position as shown in FIG. 4 with the center line 42 of the front and rear wheels being generally parallel with ground 41, with the differential or pinion housing 43 (also shown in its at rest position) being generally aligned with imaginary center line 42. Upon rapid acceleration of vehicle 3, the front portion of car frame 32 moves upwardly (FIG. 5) with the vehicle front wheels 44 being raised off ground 41 and with center line 42 being inclined with respect to the ground. Differential housing 43 also rotates upwardly which, together with the weight transfer of the vehicle caused by the sudden acceleration, forces rear axle 2 closer to the ground which flattens tire 45 of rear wheel 46. This weight transfer and rotation of axle 2 and differential housing 43 causes deflection in the general area 47 of spring 30 which is rearwardly of axle 2 and adjacent loading bar mounting assemblies 28 and 29 (FIGS. 6 and 7).

The effect of this weight transfer and resulting deflection of spring 30 and rotation of differential housing 43 which, due to the particular mounting of loading bar 1 on leaf spring 30, provides the desired and novel results of the invention. The downward deflection of spring 30 causes loading bar 1 to move downwardly, as shown in FIGS. 6 and 7, with loading bar wheel 7 engaging ground 41 nearly simultaneously with the weight transfer of vehicle 3 and resulting flattening of tire 45. Upon wheel 7 striking the ground a generally upward force (Arrow A) is exerted on rearmost strut mounting assembly 29 which creates a resultant downward force (Arrow B) on strap mounting assembly 28, as well as a second downward force (Arrow C) on axle 2 at its connection with spring 30. Force C presses tire 45 of wheel assembly 46 more firmly against ground 41, thereby increasing the traction.

Figure 5:
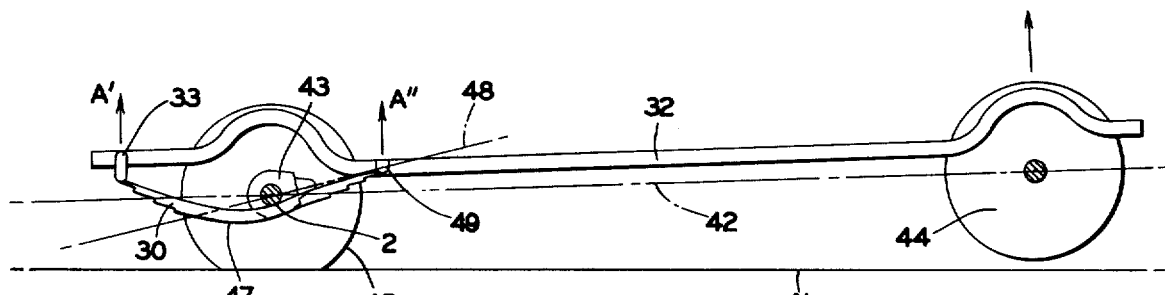
FIG. 5 is a view similar to FIG. 4 showing the vehicle chasis and leaf spring under torque loading and acceleration.

FIG. 5 illustrates spring 30 and differential housing 43 in maximum deflected positions with center line 48 which extends between the center of axle 2 and housing 43, passing through the forward mounting point 49 of spring 30. Loading bar construction 1 is mounted on spring 30 in such a position so that wheel 6 contacts the ground upon spring 30 reaching approximately two thirds of its maximum deflections, as shown in FIG. 6.

Restating the above action and effects of spring 30 and loading bar 1 in a somewhat different manner, the weight transfer and differential housing rotation exerts upward forces A' and A'' on chasis 32 (FIGS. 5–7) with resulting downward force C being exerted on tire 45. Upon wheel 7 contacting the ground, a second downward force B is created which increases the traction creating force C on tire 45 with a resulting upward force being created on the vehicle chasis 32 which increases forces A' and A''.

Although the traction gain is momentary, its importance is great in quarter mile or eighth mile drag races, where a fraction of a second can mean the difference between winning or losing a race.

The new vehicle wheel loading bar and mounting arrangement combination is extremely simple to assemble and install on an existing or new vehicle without modifying or adding components to the vehicle and without welding or drilling of installation holes being required.

The improved combination also enables a rapid change of the mounting positions on the leaf spring of the vehicle to meet particular race track conditions which may be encountered. For example, where the race track traction is very good, loading bar construction 1 would be moved rearwardly from axle 2 which decreases the lever ratio, thus, reducing the added force to the rear wheels. Where the race track traction is bad, mounting bracket assemblies 28 and 29 are moved towards axle 2 which increases the lever ratio thereby increasing the traction forces on tire 45. The ease of adjustment of loading bar 1 along the leaf spring enables the loading bar to be properly adjusted with respect to a particular leaf spring since the deflection characteristics of leaf springs change among the various vehicles and with the age and wear of the springs.

Simplicity, convenience, and efficiency are enhanced further by the simple strutural arrangement of the components, and particularly of the adjustable mounting assemblies 28 and 29.

Accordingly, the construction of the loading bar is simplified, provides an effective, safe, inexpensive, and efficient device which when combined with the leaf spring of a vehicle achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the vehicle wheel loading bar and mounting arrangement is constructed and used, the characteristics of the construction, and the advantageous, new and useful results obtained; the new and useful structures, devices, elements, arrangements, parts, and combinations, are set forth in the appended claims.

We claim:

1. Vehicle wheel loading bar construction in combination with a leaf spring of a vehicle wheel assembly including:
   a. a vehicle having a rear axle and at least a single wheel rotatably mounted on said axle;
   b. leaf spring means operatively mounted on the axle and extending rearwardly to a fixed support on the vehicle;
   c. wheel loading bar means mounted on the leaf spring means generally adjacent to and rearwardly of the axle;
   d. the wheel loading bar means including strut means mounted on the leaf spring means in a spaced relationship and extending rearwardly therefrom and terminating in an extended end;
   e. the strut means including first and second strut members with one end of the first strut member being mounted on the leaf spring means adjacent to and rearwardly of the rear axle, and with said first strut member extending generally parallel to the ground when the loading bar construction is in a static position;
   f. one end of the second strut member being adjustably mounted on the leaf spring means and spaced rearwardly of said one end of the first strut member, with said second strut member extending in a downwardly rearwardly direction with respect to the leaf spring means;

g. the second strut member mounting means including a pair of angles pivotally mounted on said one end of the second strut member, a reinforcing clamping plate and U-bolt means, with the leaf spring means being clamped between said U-bolt means and reinforcing clamping plate; and h. loading bar wheel means mounted on the other ends of the strut means, said wheel means being adapted to move downwardly and contact the ground upon acceleration of the vehicle and resulting deflection of the leaf spring means adjacent the spaced mounting of the strut means to increase the starting traction of the vehicle wheel.

2. The combination defined in claim 1 in which the other ends of the first and second strut members are adjustably connected together; and in which the loading bar wheel means is mounted at the junction of said other ends of the first and second strut members.

3. The combination defined in claim 1 in which the first strut member is a tubular metal member; and in which the second strut member is a flat, strap-like metal bar.

4. The combination defined in claim 1 in which the first strut member is adjustably mounted on the leaf spring means; in which the first strut member mounting means includes upstanding bracket means having a generally horizontal clamping portion and U-bolt means; and in which the U-bolt means clamps the leaf spring means between said U-bolt means and the bracket means horizontal clamping portion.

5. The combination defined in claim 4 in which the upstanding bracket means further includes a pair of generally U-shaped members, each having a web and a pair of spaced legs; and in which the webs are joined in abutting relationship, with one leg of each U-shaped member together forming the horizontal clamping portion of the upstanding bracket means.

6. Vehicle wheel loading bar construction adapted to be mounted on a rear axle leaf spring of a vehicle including:

a. first strut means having first and second ends;

b. upstanding bracket means including a U-bolt being mounted on the first end to adjustably clamp said first strut means on the leaf spring adjacent to and rearwardly of the vehicle axle;

c. second strut means having first and second ends;

d. angle means pivotally mounted on the first end of the second strut means, and a second U-bolt engaged with said angle means being adapted to adjustably clamp the second strut means on the leaf spring spaced rearwardly of and generally adjacent to the first strut means first end;

e. wheel mounting bracket means operatively connected to and joining the second ends of the first and second strut means, with said second strut means being adapted to extend in an upwardly inclined direction with respect to the first strut means when mounted on the leaf springs; and f. wheel means rotatably mounted on the wheel mounting bracket means, said wheel means being adapted to engage the ground upon sudden acceleration of the vehicle, with the first and second strut means providing leverage to force a vehicle rear wheel down onto the ground to increase the traction of the vehicle wheel with the ground.

7. The construction defined in claim 6 in which the first strut means is a generally flat rectangular metal bar and the second strut means is a tubular metal member;
and in which said first strut means is in tension and the second strut means is in compression when said strut means provides leverage to increase traction of the vehicle wheel.

8. The construction defined in claim 6 in which the second ends of the first and second strut means are pivotally joined with respect to each other; and in which said pivotal junction of the second ends is adjustable.

9. The construction defined in claim 6 in which the second strut means is shorter in length than the first strut means.

10. Vehicle wheel loading bar construction in combination with a leaf spring of a vehicle rear wheel assembly including:

a. a vehicle having a rear axle and at least a single wheel rotatably mounted on said axle;

b. leaf spring means operatively mounted on the axle and extending rearwardly toward the rear of the vehicle and being attached to a fixed support on the vehicle;

c. wheel loading bar means mounted on the leaf spring means;

d. said wheel loading bar means including a pair of strut means, each of said strut means having first and second ends;

e. a pair of first bracket means each being mounted on a respective first end of the strut means, said first bracket means being mounted in a spaced relationship on and in direct engagement with the leaf spring means rearwardly of the rear axle and free of direct engagement with said rear axle;

f. second bracket means mounted on the second ends of the strut means and operatively joining together said second ends; and g. wheel means mounted on the second bracket means at the second ends of the strut means, with said wheel means being adapted to move downwardly and contact the ground upon acceleration of the vehicle and resulting deflection of the leaf spring means adjacent the spaced mounting of the strut means to increase the starting traction of the vehicle wheel.

11. The combination defined in claim 10 in which the second ends of the strut means are adjustably connected together.

12. The combination defined in claim 10 in which one of the strut means is a tubular metal member and the other of the strut means is a generally flat metal bar; and in which said other one of the strut means extends generally parallel to the ground when the loading bar means is in a static position.

13. The combination defined in claim 10 in which each of the first bracket means includes a U-shaped bolt for adjustably clamping the first ends of the strut means on the leaf spring means.

14. The combination defined in claim 10 in which one of the strut means is a rigid tubular-shaped member pivotally mounted at both ends on its first bracket means and on the second bracket means, respectively; and in which the other of the strut means is a flexible generally flat metal strap member rigidly connected at both ends to its first bracket means and to the second bracket means, respectively.

15. The combination defined in claim 14 in which the second bracket means includes a pair of U-shaped channels, each having pairs of spaced channel legs and connecting webs; in which the bracket webs are joined together with the second end of the flat metal strap member being located therebetween; and in which the second end of the tubular-shaped member being pivotally mounted between the channel legs of one of U-shaped channels; and in which the wheel means is pivotally mounted between the channel legs of the other of the U-shaped channels.

16. Vehicle wheel loading bar construction in combination with a leaf spring of a vehicle wheel assembly including:

a. a vehicle having a rear axle and at least a single wheel rotatably mounted on said axle;
   b. leaf spring means operatively mounted on the axle and extending rearwardly towards and attached to a fixed support on the vehicle;
   c. wheel loading bar means mounted on the leaf spring means generally adjacent to and rearwardly of the axle;
   d. said wheel loading bar means including first and second strut members, with said first member being a rigid metal tube and said second member being a flat metal bar;
   e. first bracket means mounted directly on the leaf spring means rearwardly of the rear axle, with one end of the first strut member being pivotally mounted on said first bracket means;
   f. second bracket means mounted directly on the leaf spring means and located between and spaced from said first bracket means and rear axle, with the second strut member being rigidly connected to said second bracket means; and
   g. wheel means rotatably mounted on and joining together the other ends of the strut members, with the other end of the first strut member being pivotally joined to the wheel means and with the other end of the second strut member being rigidly connected to the wheel means, and with the wheel means being free of additional supports with respect to the vehicle except said strut members, whereby said wheel means moves downwardly and contacts the ground upon acceleration of the vehicle and resulting deflection of the leaf spring means adjacent the spaced mounting of the strut members to increase the starting traction of the vehicle wheel.

* * * * *